(12) United States Patent
Jung et al.

(10) Patent No.: US 11,546,795 B2
(45) Date of Patent: Jan. 3, 2023

(54) METHOD FOR TRANSMITTING PREDICTED ROUTE INFORMATION VIA MOBILE COMMUNICATION NETWORK BY TERMINAL DEVICE MOUNTED ON AUTONOMOUS VEHICLE

(71) Applicant: Samsung Electronics Co., Ltd., Suwon-si (KR)

(72) Inventors: Kyunghun Jung, Suwon-si (KR); Hakju Lee, Suwon-si (KR); Sunghee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 17/275,906

(22) PCT Filed: Jul. 31, 2019

(86) PCT No.: PCT/KR2019/009505
§ 371 (c)(1),
(2) Date: Mar. 12, 2021

(87) PCT Pub. No.: WO2020/075961
PCT Pub. Date: Apr. 16, 2020

(65) Prior Publication Data
US 2022/0060928 A1    Feb. 24, 2022

(30) Foreign Application Priority Data
Oct. 8, 2018 (KR) .................. 10-2018-0119752

(51) Int. Cl.
*H04W 28/02* (2009.01)
*H04W 4/40* (2018.01)
(Continued)

(52) U.S. Cl.
CPC ........ *H04W 28/0268* (2013.01); *G08G 1/052* (2013.01); *G08G 1/056* (2013.01); *H04W 4/40* (2018.02)

(58) Field of Classification Search
CPC ......... G08G 1/056; G08G 1/052; H04W 4/40; H04W 28/0268
See application file for complete search history.

(56) References Cited

U.S. PATENT DOCUMENTS 10,194,294 B2    1/2019   Schmitz et al.
10,206,076 B2    2/2019   Chun et al.
(Continued)

FOREIGN PATENT DOCUMENTS

JP     2014-003355 A      1/2014
KR  10-2017-0013390 A     2/2017
(Continued)

OTHER PUBLICATIONS

International Search Report dated Nov. 5, 2019, issued in International Application No. PCT/KR2019/009505.
(Continued)

*Primary Examiner* — Ajay Cattungal
(74) *Attorney, Agent, or Firm* — Jefferson IP Law, LLP

(57) ABSTRACT

A method and a device for transmitting information related to an estimated trajectory of an autonomous vehicle are provided. The method, performed by a terminal device mounted in an autonomous vehicle, of transmitting information to a server includes: determining a format to transmit the information to the server, based on network information received from the server; estimating a trajectory of the autonomous vehicle; generating estimated trajectory information indicating the estimated trajectory of the autonomous vehicle according to the determined format; and transmitting the generated estimated trajectory information to the server.

15 Claims, 17 Drawing Sheets

(51) Int. Cl.
    *G08G 1/052*    (2006.01)
    *G08G 1/056*    (2006.01)

(56)          References Cited

U.S. PATENT DOCUMENTS

| | | | |
|---|---|---|---|
| 2006/0121418 | A1 | 6/2006 | Demarco et al. |
| 2015/0163819 | A1 | 6/2015 | Yousefi et al. |
| 2016/0339799 | A1* | 11/2016 | Hellgren ............. B60L 15/2045 |
| 2017/0034470 | A1* | 2/2017 | Kleinrock .......... H04N 5/23238 |
| 2018/0058870 | A1* | 3/2018 | Gaebler ................. G08G 1/093 |
| 2018/0139593 | A1 | 5/2018 | Chun et al. |
| 2018/0196437 | A1 | 7/2018 | Herbach et al. |
| 2018/0257645 | A1 | 9/2018 | Buburuzan et al. |
| 2019/0344783 | A1* | 11/2019 | Bertollini .......... B60W 60/0013 |
| 2019/0367021 | A1* | 12/2019 | Zhao ................. B60W 60/0011 |
| 2019/0367022 | A1* | 12/2019 | Zhao ............... B60W 30/18154 |
| 2020/0086859 | A1* | 3/2020 | McGill, Jr. .......... G05D 1/0088 |
| 2020/0260333 | A1* | 8/2020 | Kousaridas ........... H04W 28/24 |
| 2021/0037535 | A1 | 2/2021 | Stephens et al. |
| 2021/0394575 | A1* | 12/2021 | Nong ................. B60G 17/0162 |
| 2022/0146685 | A1* | 5/2022 | Borden ................ G01S 7/4813 |

FOREIGN PATENT DOCUMENTS

| | | |
|---|---|---|
| KR | 10-2018-0081001 A | 7/2018 |
| WO | 2016/200184 A1 | 12/2016 |

OTHER PUBLICATIONS

European Search Report dated Sep. 17, 2021, issued in European Application No. 19870265.6.
European Office Action dated May 18, 2022, issued in European Patent Application No. 19870265.6-1213.

* cited by examiner

FIG. 11

| SDP offer | SDP answer |
|---|---|
| m=application 49154 RTP/AVP 99<br>b=AS:3000<br>b=RS:0<br>b=RR:5000<br>a=rtpmap:99 traj_codec<br>a=fmtp:99 coordi=longi, lati, eleva<br>a=sendonly | m=application 49154 RTP/AVP 99<br>b=AS:2000<br>b=RS:0<br>b=RR:5000<br>a=rtpmap:99 traj_codec<br>a=fmtp:99 coordi=longi,lati<br>a=recvonly |

FIG. 13

| SDP offer | SDP answer |
|---|---|
| m=application 49154 RTP/AVP 99<br>b=AS:3000<br>b=RS:0<br>b=RR:5000<br>a=rtpmap:99 traj_codec<br>a=fmtp:99 coordi=longi, lati, eleva<br>a=traj_config:99 send=[x=10, y=0.01, z=10],[x=8, y=0.01, z=10], [x=6, y=0.01, z=10]<br>a=sendonly | m=application 49154 RTP/AVP 99<br>b=AS:2000<br>b=RS:0<br>b=RR:5000<br>a=rtpmap:99 traj_codec<br>a=fmtp:99 coordi=longi,lati<br>a=traj_config:99 recv=[x=8,y=0.01,z=10], [x=6, y=0.01, z=10]<br>a=recvonly |

METHOD FOR TRANSMITTING PREDICTED ROUTE INFORMATION VIA MOBILE COMMUNICATION NETWORK BY TERMINAL DEVICE MOUNTED ON AUTONOMOUS VEHICLE

TECHNICAL FIELD

The disclosure relates to a method and a device for transmitting information related to an estimated trajectory of an autonomous vehicle. More particularly, the disclosure relates to a method and a device for adaptively transmitting estimated trajectory information according to various road conditions, by using a limited transmission bandwidth of a mobile communication network.

BACKGROUND ART

An autonomous vehicle moves to a destination while avoiding nearby vehicles or obstacles by analyzing information received from various sensors that are mounted thereon, such as a camera, a radar device, a lidar device, a global positioning system (GPS), etc. However, artificial intelligence (AI) configured to control a vehicle is not as flexible as the human brain that is familiar with driving, and a sensing or a detection range of sensors in the vehicle is limited, so that it is difficult to improve the performance of autonomous driving and various traffic accidents may be caused. Thus, a method, whereby a traffic management server collects an estimated trajectory of each of vehicles and the vehicles share the collected estimated trajectories, is provided, in order to increase a driving efficiency of changing a lane or to avoid accidents by pre-recognizing obstacles in blind spots.

DESCRIPTION OF EMBODIMENTS

Technical Problem

Provided is a method of maximally using a limited transmission bandwidth in various road conditions, when autonomous vehicles transmit estimated trajectory information to a traffic management server through a mobile communication network.

Solution to Problem

According to an aspect of the disclosure, a method, performed by a terminal device mounted in an autonomous vehicle, of transmitting information to a server includes: determining a format to transmit the information to the server, based on network information received from the server; estimating a trajectory of the autonomous vehicle; generating estimated trajectory information indicating the estimated trajectory of the autonomous vehicle according to the determined format; and transmitting the generated estimated trajectory information to the server.

According to another aspect of the disclosure, a terminal device mounted in an autonomous vehicle and communicating with a server includes: a communicator configured to receive network information from the server; and at least one processor configured to determine a format to transmit information to the server based on the received network information, estimate a trajectory of the autonomous vehicle, and generate estimated trajectory information indicating the estimated trajectory of the autonomous vehicle according to the determined format, wherein the communicator is further configured to transmit the generated estimated trajectory information to the server.

According to another aspect of the disclosure, an autonomous driving system includes a terminal device mounted in an autonomous vehicle, and a server, wherein the server is configured to transmit network information to the terminal device, and the terminal device is configured to determine a format to transmit information to the server based on the network information received from the server, estimate a trajectory of the autonomous vehicle, generate estimated trajectory information indicating the estimated trajectory of the autonomous vehicle according to the determined format, and transmit the generated estimated trajectory information to the server.

Advantageous Effects of Disclosure

According to one or more embodiments of the disclosure, estimated trajectory information of an autonomous vehicle may be adaptively transmitted according to various road conditions, and thus, it is possible to maximally use a mobile communication network having a limited transmission bandwidth.

BRIEF DESCRIPTION OF DRAWINGS

FIG. 11 is an example of session description protocol (SDP) messages exchanged between a terminal device and a server, according to an embodiment.

FIG. 13 is an example of SDP messages exchanged between a terminal device and a server, according to an embodiment.

BEST MODE

Figure 1:
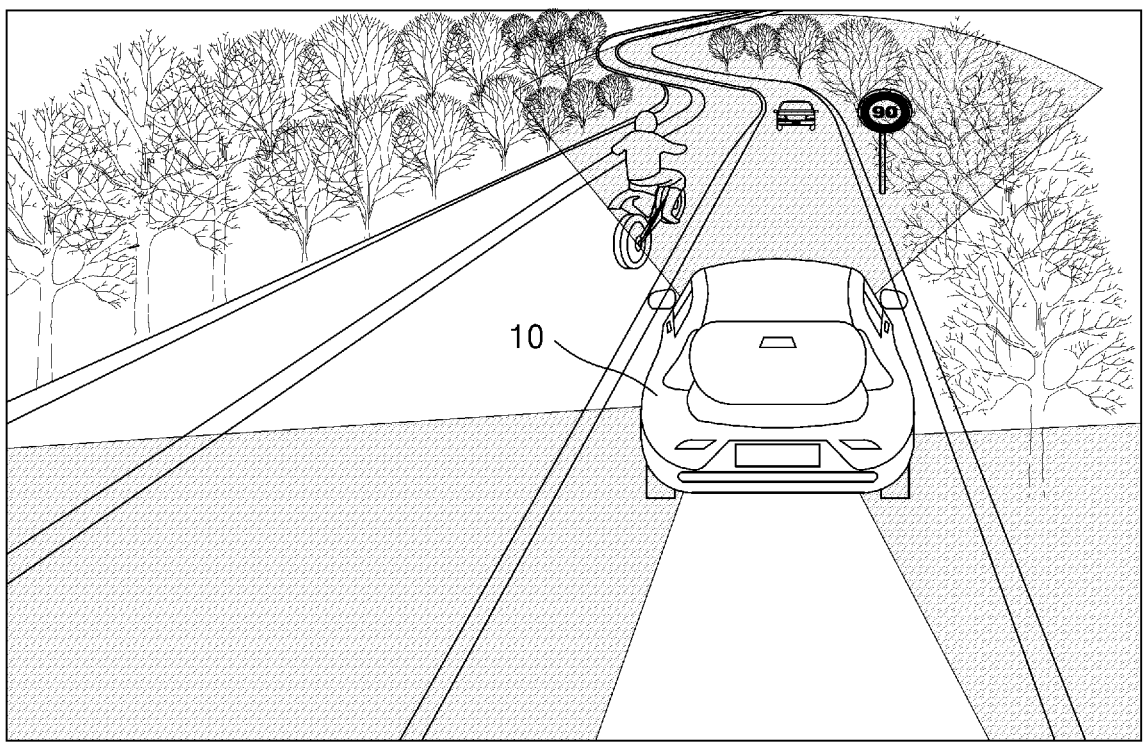
FIG. 1 is a diagram for describing an autonomous driving system according to an embodiment.

According to an aspect of the disclosure, a method, performed by a terminal device mounted in an autonomous vehicle, of transmitting information to a server includes: determining a format to transmit the information to the server, based on network information received from the server; estimating a trajectory of the autonomous vehicle; generating estimated trajectory information indicating the estimated trajectory of the autonomous vehicle according to the determined format; and transmitting the generated estimated trajectory information to the server.

Mode of Disclosure

Hereinafter, embodiments of the disclosure will be described in detail by referring to the accompanying drawings, for one of ordinary skill in the art to easily execute the embodiments. However, the disclosure may be embodied in various different forms and is not limited to the embodiments described herein. Also, in the drawings, aspects of the disclosure that are not relevant to the descriptions are omitted for clearly describing the disclosure. Also, throughout the specification, like elements are referred to by like reference numerals.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ techniques according to the related art for electronics configuration, signal processing and/or data control.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

Hereinafter, the disclosure will be described in detail with reference to the accompanying drawings.

FIG. 1 is a diagram for describing an autonomous driving system according to an embodiment.

As illustrated in FIG. 1, in an environment in which there is no intervention of a driver or in which there is relatively less intervention of a driver, an autonomous vehicle 10 may drive safely to a destination by autonomously recognizing, determining, and controlling ambient environments and statuses of the vehicle.

For example, in order to recognize the ambient environment and the status of the vehicle, the autonomous vehicle 10 may include: a lidar device and a camera mounted on an upper portion thereof; and various sensors, such as a radar device, a global positioning system (GPS), etc., mounted on a front portion and a rear portion thereof, wherein the lidar device is configured to recognize an ambient situation by emitting a low power laser beam and using a pattern reflected from the emitted low power laser beam, the camera is configured to capture an image, and the radar device is configured to emit electromagnetic waves and recognize the situation through a pattern reflected from the emitted electromagnetic waves. Also, the autonomous vehicle 10 may store map data including precise road information of a region to drive and run an AI program through a high speed graphics processing unit (GPU) to analyze information that is, from moment to moment, input from the sensors, in order to control a speed and/or a direction of the vehicle.

However, the autonomous vehicle receiving information about an ambient environment through various sensors that are mounted thereon may not obtain information about an object, which is hidden by an obstacle, such as a building or a mountain, though the object is located near to the autonomous vehicle.

Figure 2:
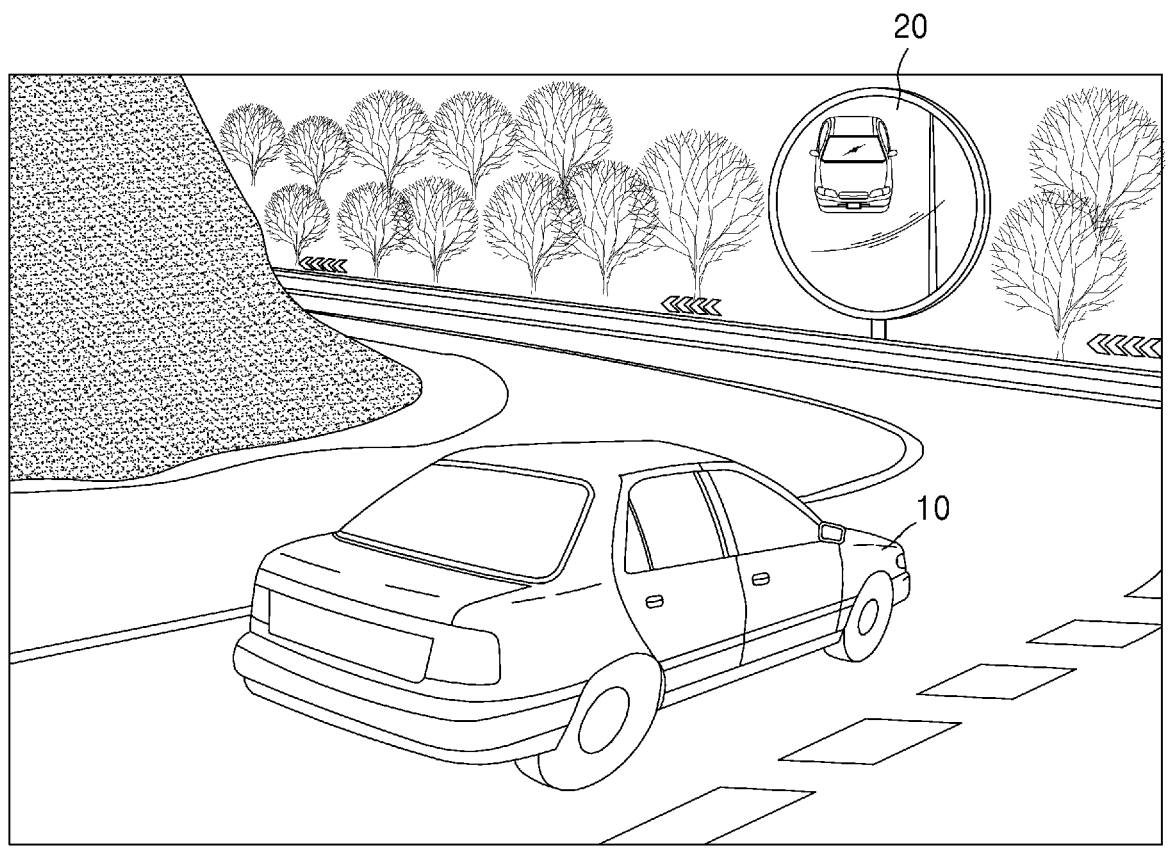
FIG. 2 is a diagram for describing a need for sharing, between autonomous vehicles, an estimated trajectory.

For example, as the situation illustrated in FIG. 2, when the autonomous vehicle 10 drives on a highly bent lane that permits a limited sight, a probability of a collision with an obstacle may be increased, and thus, the autonomous vehicle 10 may drive at a decreased speed. In the case of a road, in which a view is limited, as illustrated in FIG. 2, a curved mirror is mounted around the road, in general. Accordingly, a driver directly driving a vehicle may identify, through the curved mirror, a vehicle coming toward the vehicle from the opposite side or an obstacle located in a blind spot, and may avoid an expected collision or carefully drive the vehicle. However, in the case of the autonomous vehicle 10, due to a direction of the curved mirror or a limited resolution of the sensors, the sensors such as a camera, or the like which are mounted in the autonomous vehicle 10 may not easily recognize an image on the mirror. Thus, in the case of the autonomous vehicle 10, the driving speed may have to be lowered as possible, when the autonomous vehicle 10 drives on a road permitting a limited view.

Therefore, as a method of safely driving on the road permitting the limited view, a method of exchanging driving information among vehicles is provided.

As the method of exchanging the driving information among the vehicles, for example, there is a method of broadcasting information, such as a speed, a direction, a past/future trajectory of a vehicle, to nearby vehicles through the dedicated short-range communications (DSRC). However, height of antennas mounted in the vehicles may be low, and thus, it may be difficult to maintain smooth transmission and reception in the communication among the vehicles.

Also, according to the related art, a network connecting vehicles does not schedule a transmission and a reception of driving information of each vehicle. Thus, it may be difficult to avoid a collision of signals each emitted from the vehicles, and an obtained limited bandwidth may not be maximally utilized for controlling traffic.

To overcome these problems of the related art, an autonomous vehicle (or a terminal device mounted in an autonomous vehicle) according to an embodiment of the disclosure may be connected to a mobile communication network, such as long-term evolution (LTE), the 5th generation (5G), etc., and transmit estimated trajectory information to a traffic management server connected to the network. Also, the autonomous vehicle (or the terminal device mounted in the autonomous vehicle) according to an embodiment of the disclosure may be assigned a bit rate for transmitting the estimated trajectory information and may dynamically adjust a method and/or a format for indicating and transmitting the estimated trajectory information.

Figure 3:
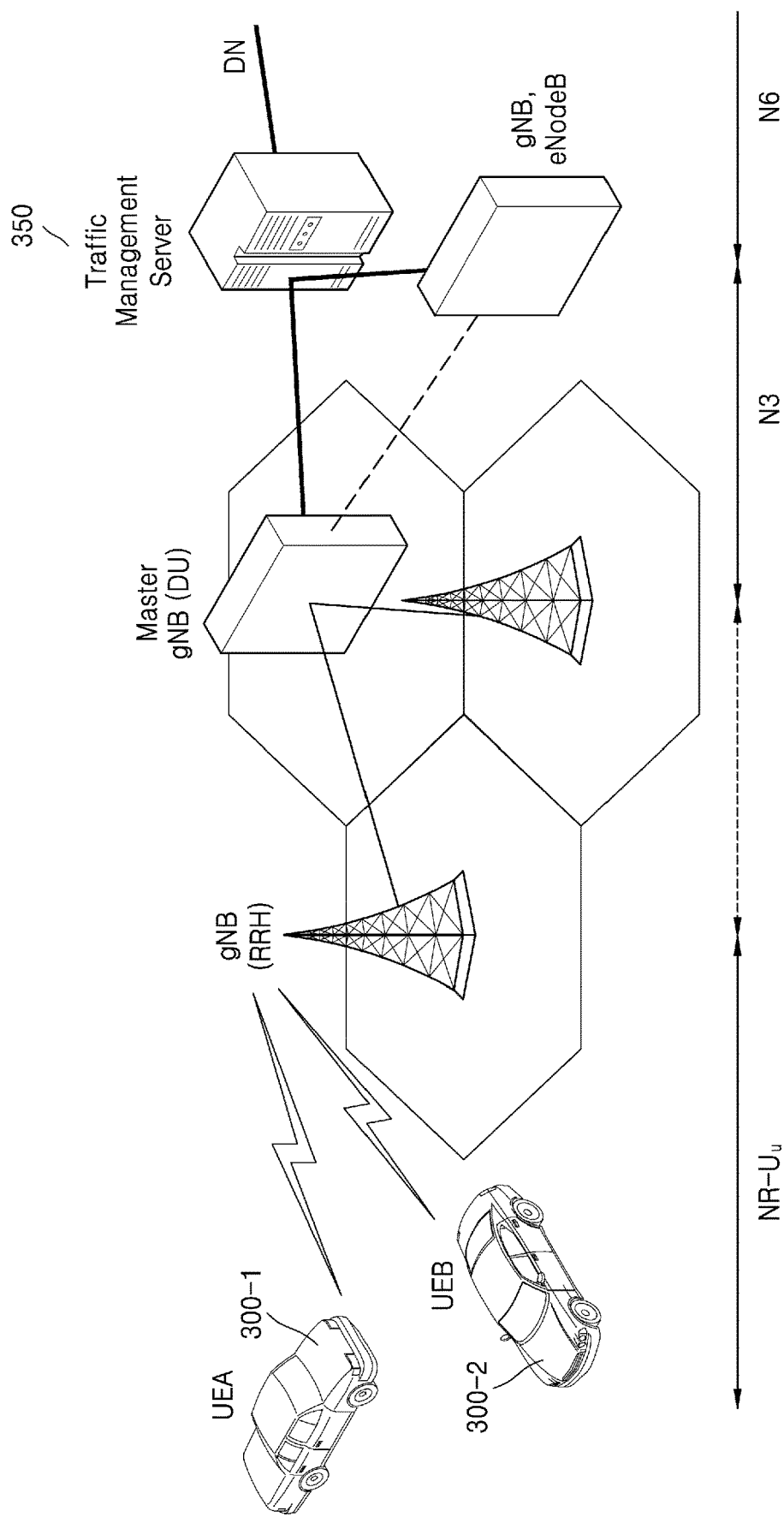
FIG. 3 illustrates a $5^{th}$-generation (5G) network architecture which may be used by an autonomous driving system according to an embodiment.

For example, the autonomous vehicle (or the terminal device mounted in the autonomous vehicle) according to an embodiment may transmit the estimated trajectory information through a mobile communication network. FIG. 3 illustrates an architecture of a mobile communication network that may be used by an autonomous driving system according to an embodiment.

As illustrated in FIG. 3, a gNB, which is a 5G base station, or an evolved Node B (eNodeB), which is an LTE base station, may be composed of a remote radio head (RRH) that is in charge of processing a radio frequency (RF) and an analog signal and a digital unit (DU) that is in charge of processing a digital signal. Here, one DU may manage a number of RRHs. Also, a gNB or an eNodeB selected as a Master may schedule transmission and reception between a plurality of gNBs and a plurality of eNodeBs in corresponding regions. In FIG. 3, a user equipment (UE) 300-1 or 300-2 may denote an autonomous vehicle or a terminal device mounted in the autonomous vehicle and transmitting and receiving data related to the autonomous vehicle (hereinafter, referred to as a terminal device). A traffic management server 350 connected to the gNB or the eNodeB may receive, collect, and process estimated trajectory information received from each of vehicles and may provide the information again to the vehicles. The traffic management server 350 may be mounted around the base station as a mobile edge server (MEC), as illustrated in FIG. 3, or may be located in a cloud through a data network (DN).

The autonomous driving system according to an embodiment may include an autonomous vehicle, a terminal device mounted in the autonomous vehicle, a traffic management server, and a network connecting the terminal device with the server.

Figure 4:
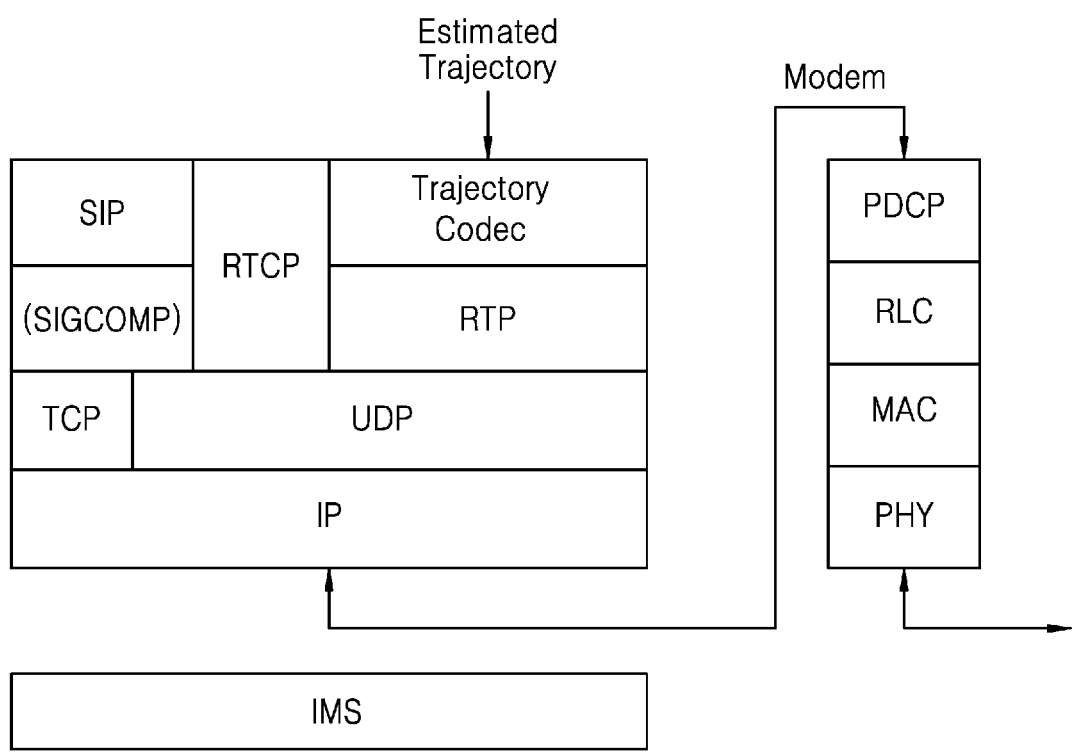
FIG. 4 illustrates an example of a protocol structure of an autonomous driving system according to an embodiment.

FIG. 4 illustrates an example of a protocol structure of an autonomous driving system according to an embodiment.

A normal multimedia communication system may be used in the autonomous driving system according to an embodiment.

However, in the case of an existing multimedia communication system providing a voice call and a video call, a voice codec and a video codec may be located on an RTP protocol. However, in the case of the autonomous driving system according to an embodiment, a codec compressing estimated trajectory information provided by artificial intelligence (AI) of the autonomous vehicle (hereinafter, referred to as a trajectory codec) may be located on the RTP protocol.

The estimated trajectory information may be indicated as a longitude, a latitude, and an elevation of coordinate values included in an estimated trajectory and may have a format especially suited for a predetermined region or a map.

A real time control protocol (RTCP) of FIG. 4 may be used to control a real time data transmission in an internet protocol (IP)-based network. The RTCP may be control packets for handling data congestion. An IP multimedia subsystem (IMS) may include procedures for negotiating a format and a transmission scheme of the estimated trajectory information.

A modem illustrated in FIG. 4 may support at least one of 5G and LTE. A packet data convergence protocol (PDCP), radio link control (RLC), media access control (MAC), physical layer (PHY), etc. may be wireless communication protocols constituting a 5G or an LTE modem of a terminal device and a base station.

The estimated trajectory information provided by the AI controlling the autonomous driving may be cyclically compressed by the trajectory codec and may be configured as a packet in which an RTP/UDP/IP header is attached and transmitted to the modem, and the packet may be received by a GNB and may arrive at the traffic management server. This transmission may have to be adjusted by taking into account road situations.

Figure 5A:
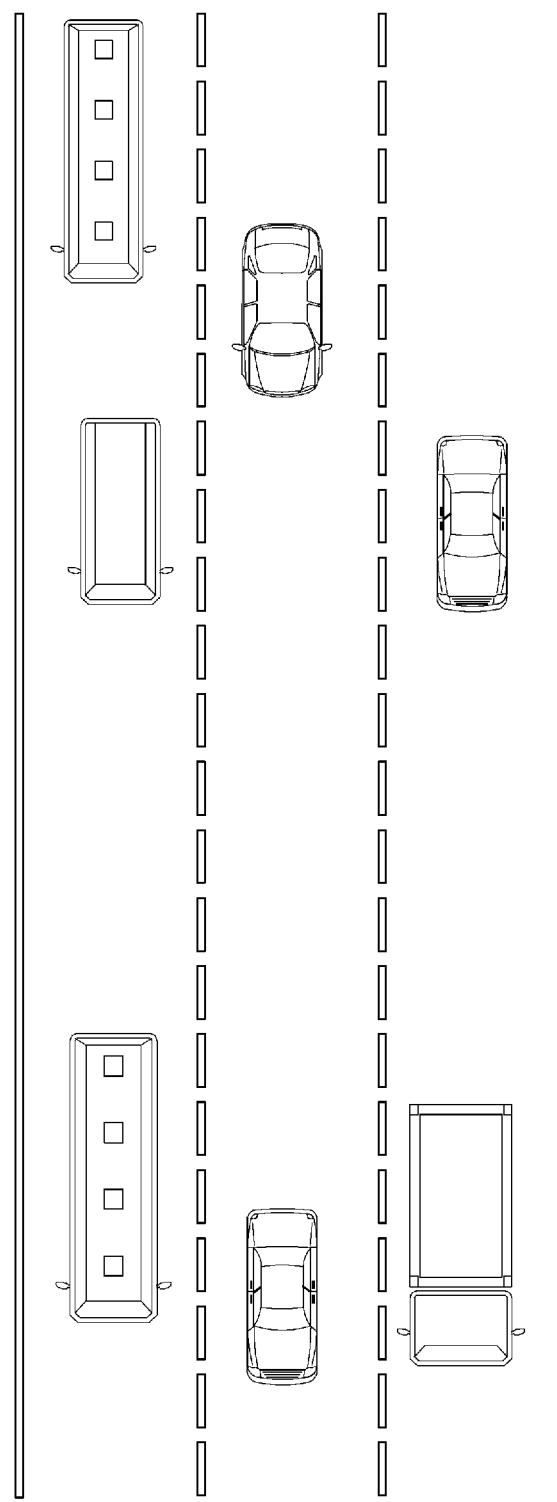
FIGS. 5A, 5B, and 5C are diagrams for describing various road conditions.

FIG. 5A illustrates a road having a smooth traffic condition. In a situation illustrated in FIG. 5A, distances between vehicles may be great, and the vehicles may drive at a relatively high speed. Thus, when a terminal device mounted in an autonomous vehicle estimates a trajectory of the autonomous vehicle, the terminal device may estimate that the vehicle may move a relatively great distance in a unit time. Also, because a density of the vehicles on the road is low, a scheduler of a gNB may easily manage a transmission and reception time so as to receive estimated trajectory information of each vehicle without a loss.

Figure 5B:
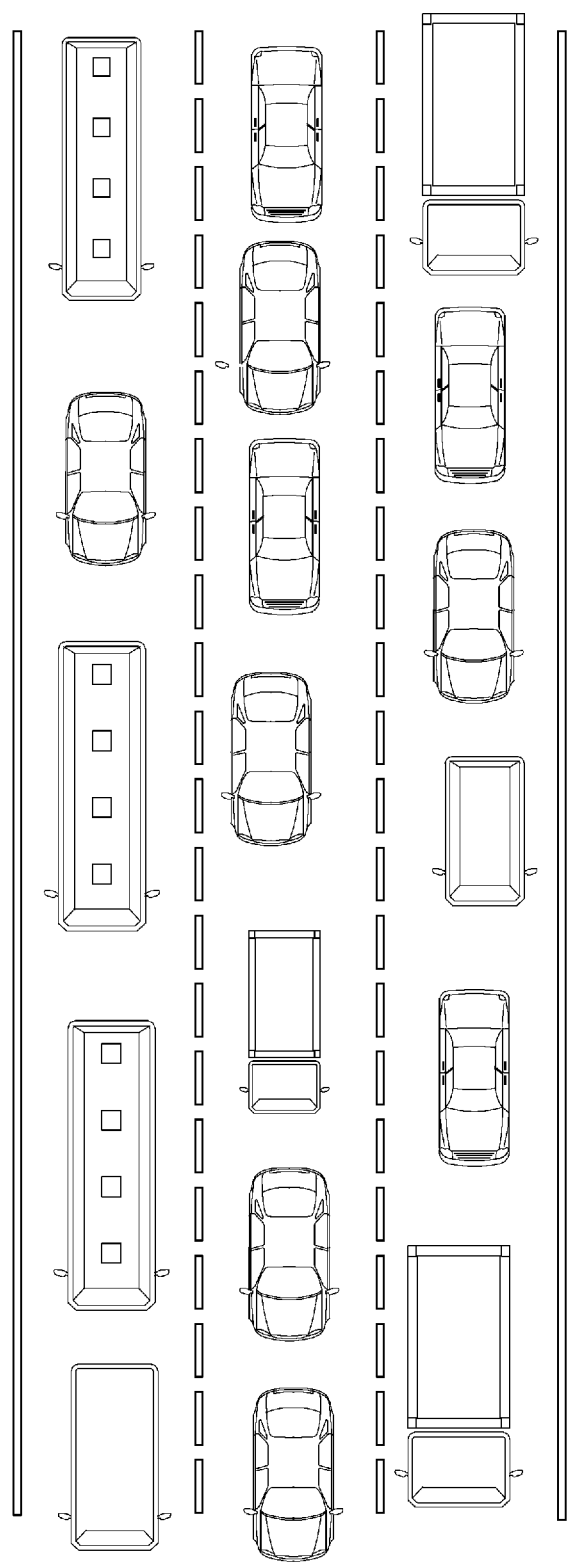

Compared with FIG. 5A, FIG. 5B illustrates a situation in which a great number of vehicles simultaneously enter into a road and congestion occurs. In the situation illustrated in FIG. 5B, distances between vehicles may be less, and the vehicles may drive at a relatively low speed. Thus, when a terminal device mounted in an autonomous vehicle estimates a trajectory of the autonomous vehicle, the terminal device may estimate that the vehicle may move a relatively less distance in a unit time. Also, because a density of the vehicles on the road is high, a scheduler of a gNB may not easily manage a transmission and reception time to receive estimated trajectory information of each vehicle without a loss.

When an uplink lacks a wireless communication resource that is available at a time point at which a vehicle is to transmit estimated trajectory information, the gNB may not be able to permit the vehicle to transmit the estimated trajectory information. The vehicle not permitted to transmit the estimated trajectory information may not transmit the estimated trajectory information that is generated at the corresponding time point and may drop a packet including the estimated trajectory information of the corresponding time point.

Figure 5C:
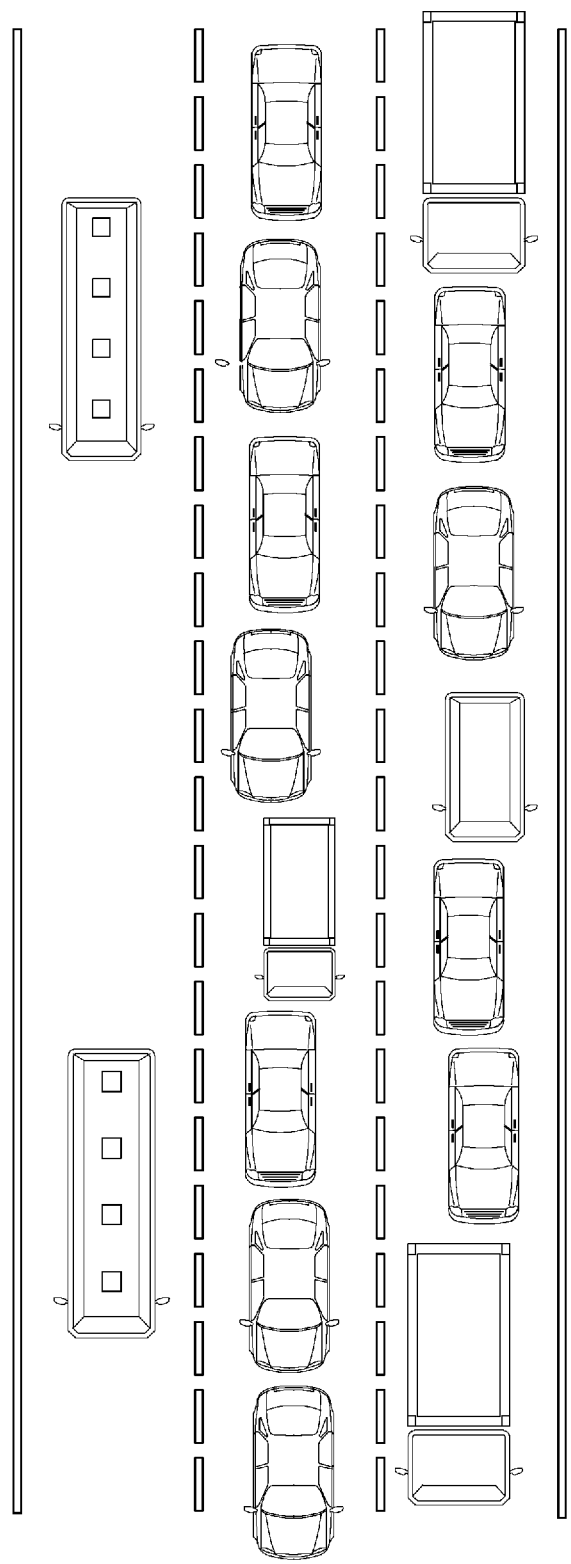

Moreover, FIG. 5C illustrates a case where, while, in some lanes, a great number of vehicles simultaneously enter into the road and congestion occurs, in other lanes, traffic is smooth. For example, when only vehicles carrying a large number of passengers are permitted to drive in a first lane, a density of the vehicles in the first lane may be lower than a density of vehicles driving in other lanes. The vehicles driving in the first lane may drive at a relatively higher speed than the vehicles driving in the other lanes.

In the situations illustrated in FIGS. 5A and 5B, the vehicles driving in all of the lanes may be required to transmit the estimated trajectory information in substantially the same scheme. In contrast, in the situation illustrated in FIG. 5C, the vehicles may be required to transmit the estimated trajectory information in different schemes depending on the lanes in which the vehicles drive.

The terminal device according to an embodiment of the disclosure may be assigned, by a mobile communication network, an available maximum bit rate according to various road conditions. The terminal device according to an embodiment may transmit the estimated trajectory information based on the assigned maximum bit rate. The terminal device according to an embodiment may transmit the estimated trajectory information by adjusting a format or a bit rate of the estimated trajectory information according to a condition of the road in which a vehicle in which the terminal device is mounted drives or a speed of the vehicle. Thus, the terminal device according to an embodiment may maximally use frequency resources and minimize the loss of the estimated trajectory information transmitted to the traffic management server.

Hereinafter, by referring to FIGS. 6 through 9, a detailed method, performed by the terminal device, of adaptively transmitting the estimated trajectory information of the autonomous vehicle according to various road conditions, is described.

Figure 6:
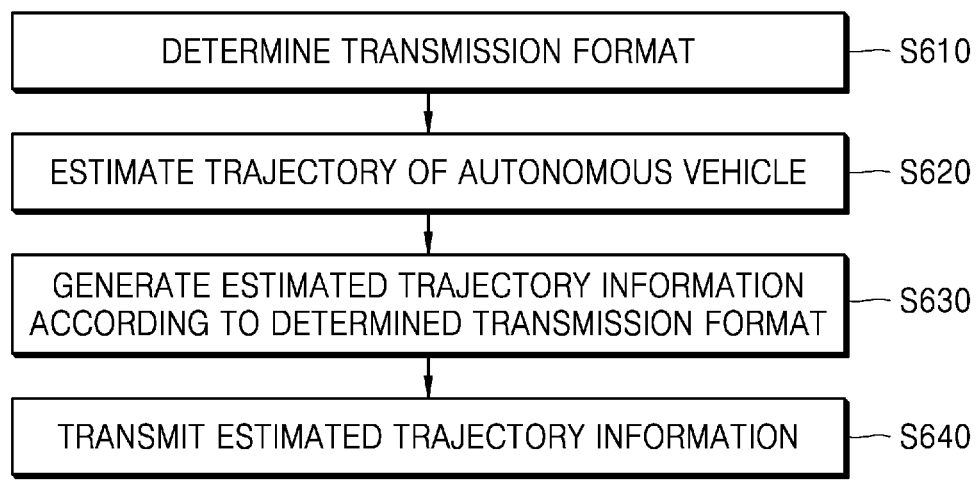
FIG. 6 is a flowchart of a method of transmitting estimated trajectory information, performed by a terminal device, according to an embodiment.

FIG. 6 is a flowchart of a method of transmitting estimated trajectory information, performed by a terminal device mounted in an autonomous vehicle, according to an embodiment.

A terminal device 300 according to an embodiment may be mounted in an autonomous vehicle and may transmit and receive data related to the autonomous vehicle to and from a server through a mobile communication network. The terminal device 300 according to an embodiment may be a separate device from the vehicle, a device included in the vehicle, or at least a portion of an electronic device controlling the vehicle.

In operation S610, the terminal device 300 according to an embodiment may determine a format in which information is to be transmitted to the server, based on network information received from the server 350.

The network information may include a maximum bit rate assigned to the terminal device. The terminal device 300 may determine transmission format parameters as the format in which the estimated trajectory information is to be transmitted, based on the assigned maximum bit rate.

For example, when the terminal device 300 transmits a plurality of coordinate values included in an estimated trajectory of the autonomous vehicle as the estimated trajectory information, the transmission format parameters may include at least one of a length (x) of time for which the trajectory of the autonomous vehicle is estimated, a time interval (y) between the coordinate values, a transmission cycle (z), and the number of bytes (N) required to transmit one coordinate value. The terminal device 300 may determine the transmission format by combining a plurality of parameters, such as the estimation time (x), the interval (y) between the coordinates, and the transmission cycle (z).

Figure 7:
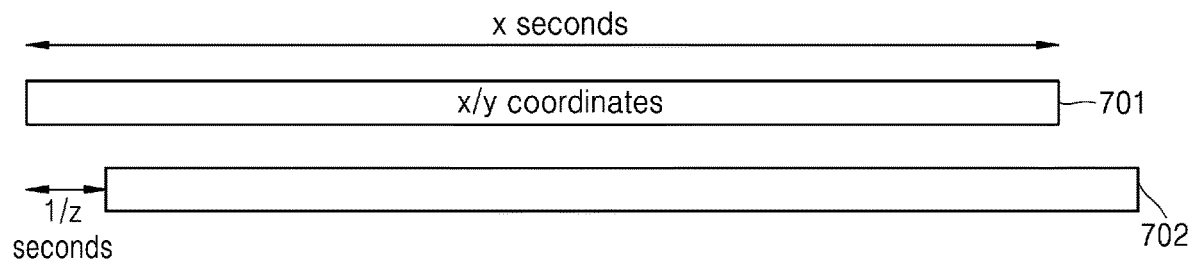
FIGS. 7 and 8 illustrate structures of estimated trajectory information, according to an embodiment.

FIG. 7 illustrates two estimated trajectory information packets 701 and 702 that are continually generated. Each packet may indicate an estimated trajectory for x seconds with x/y coordinates. The x seconds may indicate a length of time for which the trajectory of the autonomous vehicle is estimated, and y seconds may indicate a time interval between two continual coordinate values. The coordinates included in the estimated trajectory information may be indicated by indicating at least one of the longitude, the latitude, and the elevation through N bytes.

When the transmission cycle is determined as 1/z seconds, the second packet 702 may be transmitted after the 1/z seconds after the first packet 701 is transmitted, and thus, the terminal device 300 may transmit z packets per second. Considering a re-transmission method, such as Hybrid ARQ (HARQ), that is frequently used in mobile communications, the transmission of the second packet 702 may be understood to be started after the 1/z seconds after the transmission of the first packet 701 is started.

The terminal device 300 may determine the transmission format parameters for transmitting the estimated trajectory information, based on an average speed of the autonomous vehicle.

The terminal device 300 may determine a first transmission format parameter, based on the average speed of the autonomous vehicle. For example, as the average speed is increased, it becomes more difficult to accurately estimate a movement of the vehicle, and thus, there may be a need to reduce an estimation time, a transmission cycle, or a time interval between packets, and a high bit rate may be required.

When a bit rate taken to transmit the estimated trajectory information by using the first transmission format parameter is equal to or greater than a maximum bit rate granted by the server, the terminal device 300 may adjust the first transmission format parameter to a second transmission format parameter, for which a bit rate that is equal to or less than the maximum bit rate is taken.

For example, a bandwidth taken for transmitting the estimated trajectory information having the format illustrated in FIG. 7 may be 8Nxz/y bps per second.

When a bit rate taken to transmit the estimated trajectory information by using the second transmission format parameter is less than the maximum bit rate received from the server, the terminal device 300 may determine the second transmission format parameter as the transmission format parameter for transmitting the estimated trajectory information.

Figure 8:
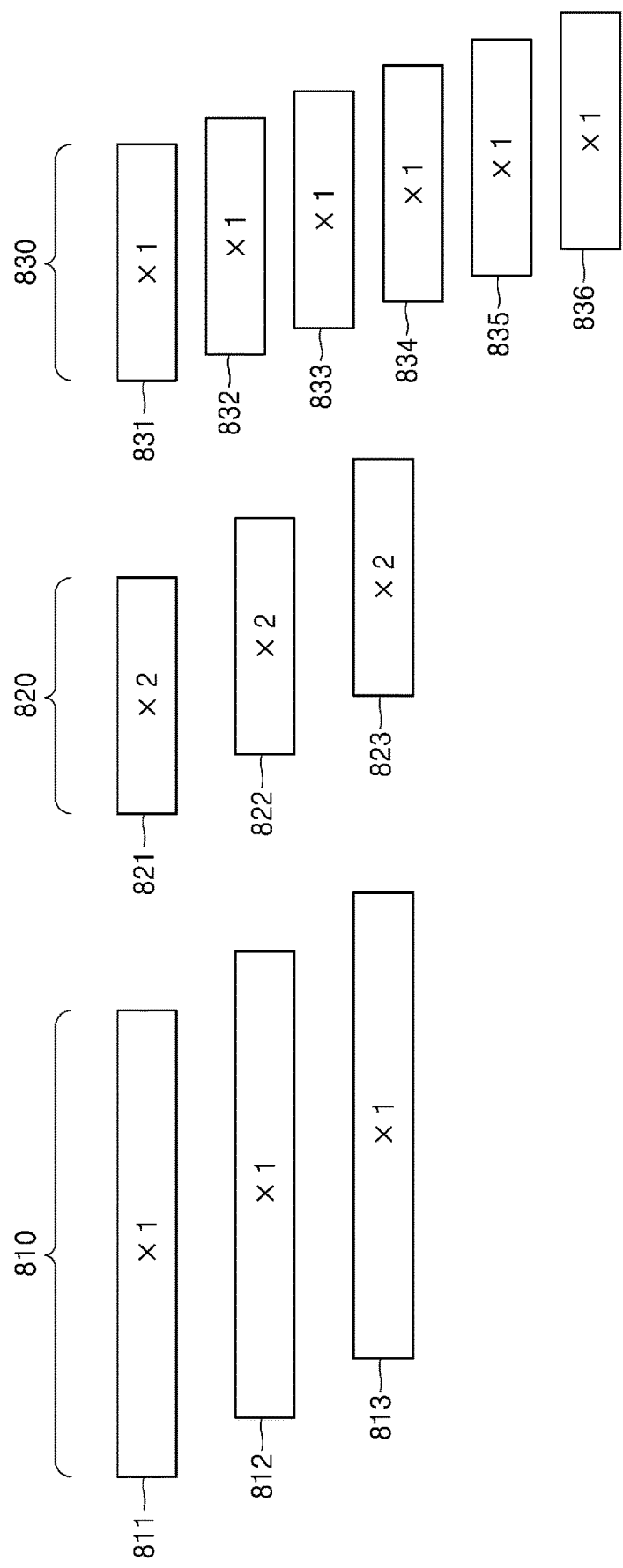

FIG. 8 illustrates structures 810, 820, and 830 of the estimated trajectory information that may be configured by using the same bit rate.

For example, the first packet structure 810 indicates a case in which a length of estimation time is x0, a time interval between coordinate values is y0, and a transmission cycle is z0. According to the first packet structure 810, each of a plurality of packets 811, 812, and 813 is transmitted at an interval of 1/z0.

The second packet structure 820 indicates a case in which a length of estimation time is x0/2, a time interval between coordinate values is y0/2, and a transmission cycle is z0. According to the second packet structure 820, each of a plurality of packets 821, 822, and 823 is transmitted at an interval of 1/z0.

Although the estimation time of the second packet structure 820 is reduced to half the estimation time of the first packet structure 810, the time interval between the coordinate values is also reduced to half the time interval between the coordinate values of the first packet structure 810. Thus, the first packet structure 810 and the second packet structure 820 may include the same number (x0/y0) of coordinate values in one packet.

The third packet structure 830 indicates a case in which a length of estimation time is x0/2, a time interval between coordinate values is y0, and a transmission cycle is 2z0. According to the third packet structure 830, each of a plurality of packets 831, 832, 833, 834, 835, and 836 is transmitted at an interval of 1/2z0.

While the estimation time of the third packet structure 830 is reduced to half the estimation time of the first packet structure 810, the time interval between the coordinate values of the third packet structure 830 is the same as the time interval between the coordinate values of the first packet structure 810, and thus, the number of coordinate values included in one packet is also reduced to half the number of coordinate values included in one packet of the first packet structure 810. However, because the interval between the packets of the third packet structure 830 is reduced to half the interval between the packets of the first packet structure 810, the third packet structure 830 may use the same bit rate as the first packet structure 810.

As illustrated in FIG. 8, the terminal device 300 according to an embodiment of the disclosure may configure the estimated trajectory information in various schemes while maintaining the same bit rate. Also, the terminal device 300 may configure the estimated trajectory information in a new scheme by adjusting the bit rate.

The terminal device 300 according to an embodiment may determine the transmission parameter for transmitting the estimated trajectory information in a scheme that is suitable for an average speed of an autonomous vehicle, without exceeding a maximum bit rate granted by the server. A specific method of determining the transmission parameter is described in more detail below with reference to FIGS. 10 through 13.

In operation S620, the terminal device 300 according to an embodiment may estimate a trajectory of an autonomous vehicle.

The terminal device 300 may estimate the trajectory based on at least one of a current location of the autonomous vehicle, map data, a shape of a lane in which the autonomous vehicle drives, a driving speed, and a driving direction. The terminal device 300 may estimate a trajectory in which the autonomous vehicle is to drive for a predetermined time period, by analyzing information that is input from various sensors, such as a lidar device, a radar device, a GPS, and a camera.

For example, the terminal device 300 may recognize a shape of a lane in which the vehicle drives, and shapes of right and left lanes of the driving lane by using the camera, the lidar device, or the radar device and may obtain a current location of the vehicle by using the GPS. The terminal device 300 may estimate a driving trajectory by using a trajectory estimation model that uses, as input data, pre-stored map data and data obtained from various sensors. AI may be used for the driving trajectory estimation.

In operation S630, the terminal device 300 according to an embodiment may generate the estimated trajectory information indicating the estimated trajectory of the autonomous vehicle according to the format determined in operation S610.

The terminal device 300 may generate the estimated trajectory information according to the transmission parameter determined in operation S610.

For example, as the transmission format parameters, the length of time at which the trajectory of the autonomous vehicle is estimated may be determined as x seconds, the time interval between the coordinate values may be determined as y seconds, and the transmission cycle may be determined as z seconds. The terminal device 300 may generate, as the estimated trajectory information, a plurality of packets indicating the estimated trajectory for the x seconds as x/y coordinate values at an interval of 1/z seconds.

In operation S640, the terminal device 300 according to an embodiment may transmit the estimated trajectory information generated in operation S630 to the server.

The terminal device 300 may transmit the plurality of packets including the estimated trajectory information according to the transmission cycle determined in operation S610. Here, the coordinates included in each packet are continually changed, and thus, the coordinates may be compressed based on a similar principle as audio data. For example, the terminal device 300 may compress the estimated trajectory information by using the trajectory codec illustrated in FIG. 4.

Figure 9:
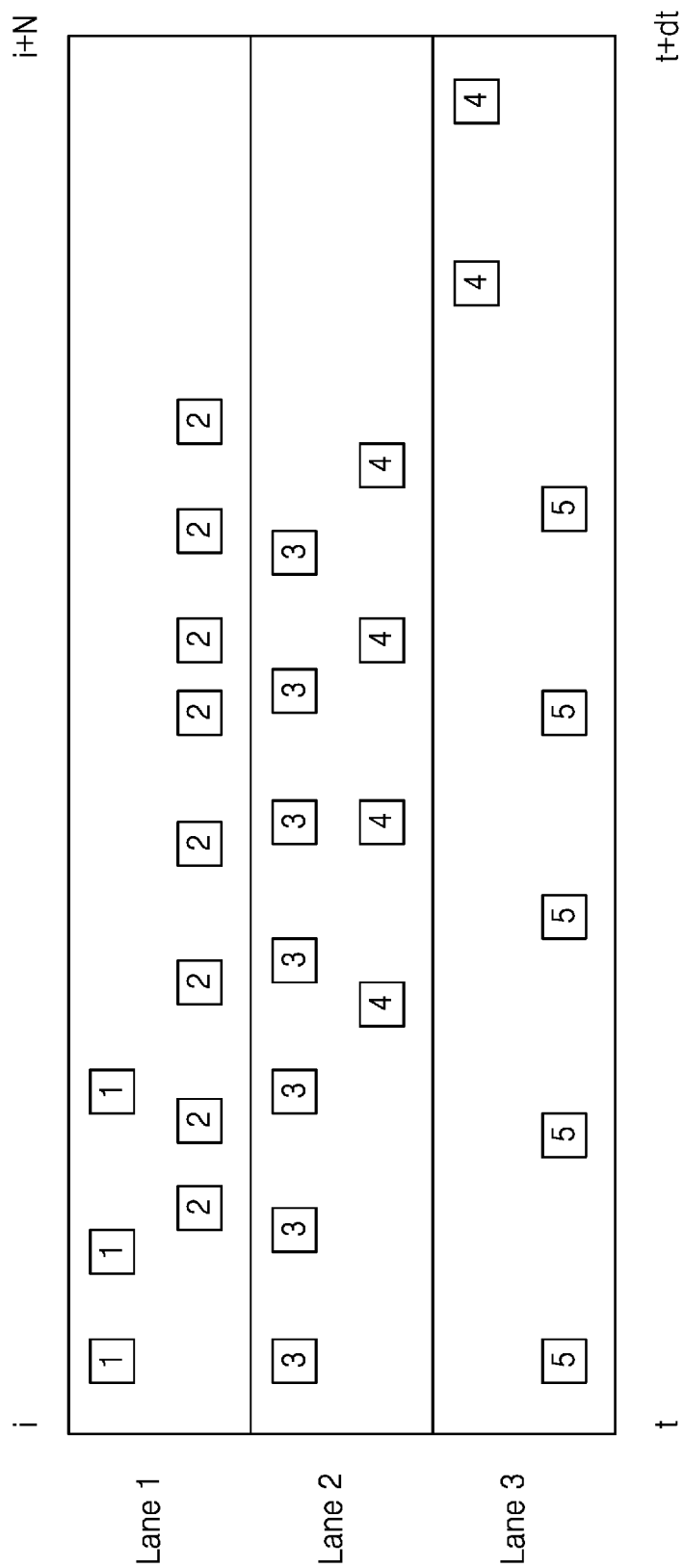
FIG. 9 illustrates estimated trajectory information of autonomous vehicles, the estimated trajectory information being collected by a server, according to an embodiment.

FIG. 9 illustrates a situation in which pieces of estimated trajectory information transmitted from terminal devices of autonomous vehicles driving in a road including three lanes are received and collected by a traffic management server. From a time t to a time t+dt, vehicles 1 and 2 may drive in a first lane 1, vehicles 3 and 4 may drive in a second lane Lane 2. Also, vehicles 4 and 5 having moved from the second lane 2 Lane 2 may drive in a third lane Lane 3. It is illustrated in FIG. 9 as if two or more vehicles are located in one lane. However, different vehicles are located at different locations at the same time point, and thus, the traffic management server may separately identify the location of each vehicle at a predetermined time point.

The estimated trajectory information of the vehicles collected from the traffic management server may be broadcast to and shared by the vehicles through multimedia broadcasting and multicasting service (MBMS), etc.

In the autonomous driving system according to an embodiment, the transmission scheme of the estimated trajectory information may be confirmed via negotiation between the terminal device and the server.

The terminal device 300 according to an embodiment may determine a transmission scheme of the estimated trajectory information of the autonomous vehicle according to an assigned bit rate. The server 350 according to an embodiment may receive all of the estimated trajectory information transmitted by the terminal device 300.

Figure 10:
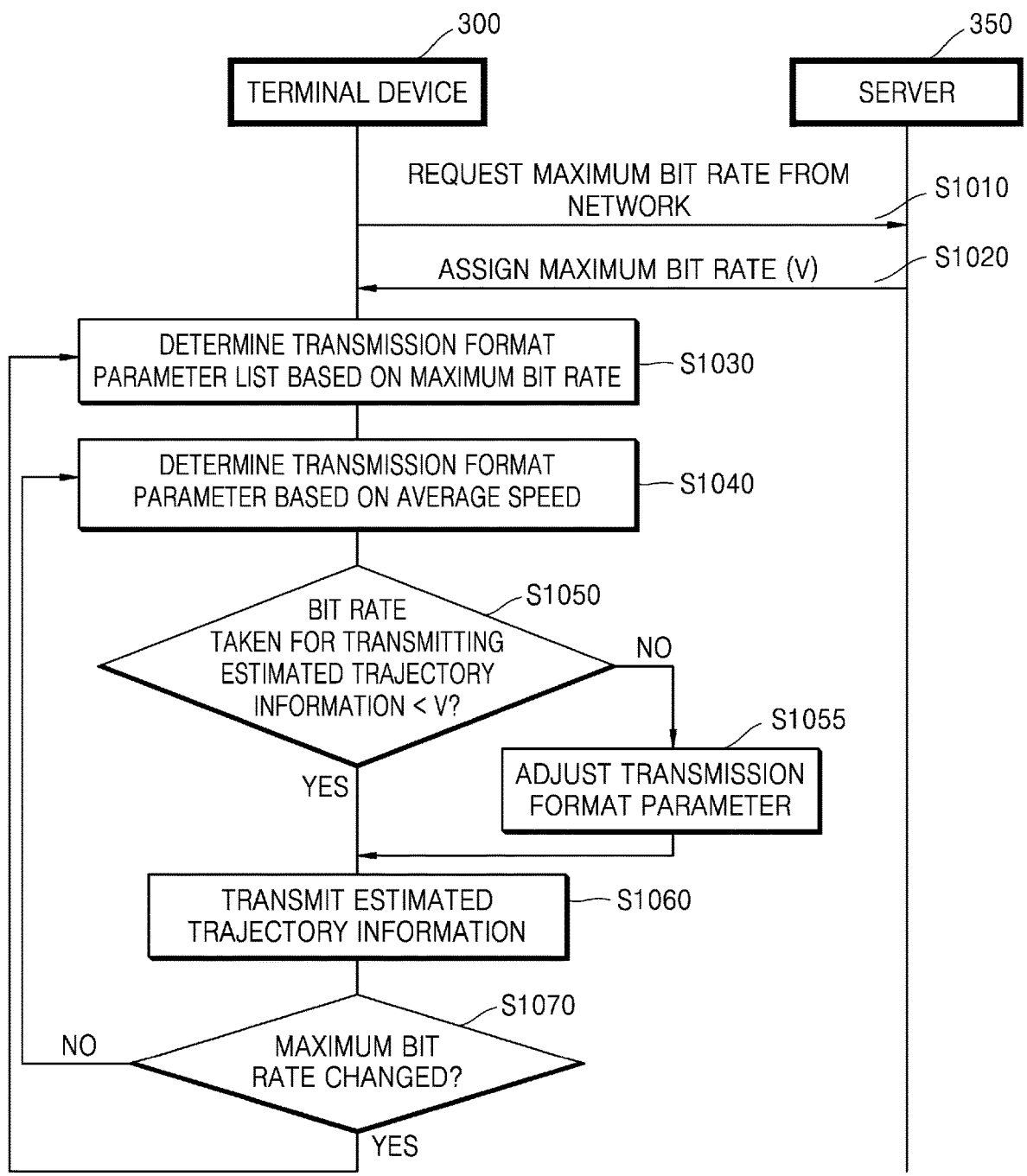
FIG. 10 is a detailed flowchart of a method of transmitting estimated trajectory information, performed by a terminal device, according to an embodiment.

FIG. 10 is a detailed flowchart of a method of transmitting estimated trajectory information, performed by a terminal device, according to an embodiment.

In operation S1010, the terminal device 300 according to an embodiment may request information about a maximum bit rate from the server 350. The terminal device 300 may suggest, to the traffic management server 350 connected to a network, a maximum value of a bit rate that is to be used for a transmission of the estimated trajectory information, by using an IP multimedia subsystem (IMS), etc.

In operation S1020, the server 350 according to an embodiment may assign a maximum bit rate v in response to a request received from the terminal device 300. The traffic management server 350 may determine the maximum bit rate which may be assigned to the terminal device 300 by taking into account a rate system to which the terminal device 300 subscribes or a road condition, and may transmit information about the maximum bit rate to the terminal device 300.

FIG. 11 illustrates an example of a session description protocol (SDP) offer including a suggestion of the terminal device 300 related to a method of transmitting estimated trajectory information. Also, FIG. 11 illustrates an example of an SDP answer including a response of a server with respect to the SDP offer.

In the SDP offer of FIG. 11, the terminal device 300 may suggest that longitude, latitude, and elevation information be transmitted to the traffic management server by using a bit rate of 3000 kbps (3 Mbps). In the SDP answer of FIG. 11, the server 350 may determine that the elevation information is not needed and may reduce the maximum bit rate to be used to 2 Mbps by excluding the elevation information in the SDP answer.

In operation S1030, the terminal device 300 according to an embodiment may determine a list of transmission format parameters, based on the maximum bit rate. The terminal device 300 may determine the transmission format parameter list including transmission format parameters available to the terminal device 300, based on the maximum bit rate assigned by the network.

For example, the transmission format parameter according to an embodiment may be in the form of a vector including a length (x) of time for which a trajectory of an autonomous vehicle is estimated, a time interval (y) between coordinate values, and a transmission cycle (z).

In operation S1040, the terminal device 300 according to an embodiment may determine the transmission format parameter, based on an average speed. The terminal device 300 may select one transmission format parameter suitable for the average speed, from among the available transmission format parameters included in the transmission format parameter list. For example, the terminal device 300 may select (x0, y0, z0) as the transmission format parameter suitable for an average speed of the vehicle for recent a seconds.

In operation S1050, the terminal device 300 according to an embodiment may determine whether a bit rate taken to transmit the estimated trajectory information by using the transmission parameter determined in operation S1040 is less than the bit rate v. In operation S1055, when the bit rate that is taken is equal to or greater than the bit rate v, the terminal device 300 according to an embodiment may adjust the transmission format parameter.

The terminal device 300 may generate the estimated trajectory information by using the transmission format parameter determined in operation S1040 or the transmission parameter adjusted in operation S1055 and may transmit the generated estimated trajectory information to the server 350 (S1060).

For example, the terminal device 300 may select the transmission format parameter (x0, y0, z0) as a transmission scheme suitable for the average speed of the vehicle for the recent a seconds. A bit rate that is taken to transmit the estimated trajectory information by using the selected transmission format parameter (x0, y0, z0) may be calculated as 8Nx0z0/y0 (bps). The terminal device 300 may determine whether or not the bit rate that is taken according to the selected scheme is less than the maximum bit rate v permitted by the network.

When the bit rate 8Nx0z0/y0 (bps) that is taken according to the selected scheme is within the maximum bit rate v that is permitted by the network, the terminal device 300 may transmit the estimated trajectory information for b0 seconds by using the selected transmission format parameter (x0, y0, z0).

When the bit rate 8Nx0z0/y0 (bps) that is taken according to the selected scheme is equal to or greater than the maximum bit rate v that is permitted by the network, the terminal device 300 may adjust the transmission scheme to be within the permitted range by adjusting the transmission format parameter. The terminal device 300 may adjust the transmission format parameter to (x1, y1, z1).

The terminal device 300 may adjust the transmission format parameter such that a bit rate 8Nx1z1/y1 (bps) that is taken according to the adjusted transmission format parameter is within the maximum bit rate v that is permitted by the network. The terminal device 300 may transmit the estimated trajectory information for b1 seconds by using the adjusted transmission format parameter (x1, y1, z1).

The terminal device 300 may transmit the estimated trajectory information by including the transmission format parameter used to configure the estimated trajectory information that is transmitted to the server 350 in a header. The server 350 may extract the transmission format parameter (x, y, z) used to configure the corresponding information, from the header attached to the estimated trajectory information received from the terminal device 300.

According to cases, the terminal device 300 may identify whether the network changes the maximum bit rate assigned to the estimated trajectory information (S1070). When the maximum bit rate is not changed, the terminal device 300 may repeatedly perform operations S1040 through S1060. When it is determined that the maximum bit rate assigned to the terminal device 300 is changed in operation S1070, the terminal device 300 may return to operation S1030 and may determine the transmission format parameter list based on the changed maximum bit rate.

According to the embodiment of the disclosure illustrated in FIGS. 10 and 11, the terminal device 300 may determine the transmission scheme of the estimated trajectory information according to the maximum bit rate assigned by the network, and the traffic management server 350 may receive all estimated trajectory information transmitted from the terminal device 300. That is, according to the embodiment of the disclosure illustrated in FIGS. 10 and 11, the terminal device 300 may freely determine the transmission scheme within the maximum bit rate assigned from the network.

However, there may be a case in which the estimated trajectory information in a predetermined format may have to be transmitted to the traffic management server 350. For example, the traffic management server 350 may prefer a predetermined scheme to efficiently use the data format illustrated in FIG. 9 or may require a predetermined scheme to examine the estimated trajectory information by using AI. Thus, according to another embodiment of the disclosure, the server 350 may confirm a transmission scheme of the estimated trajectory information.

Figure 12:
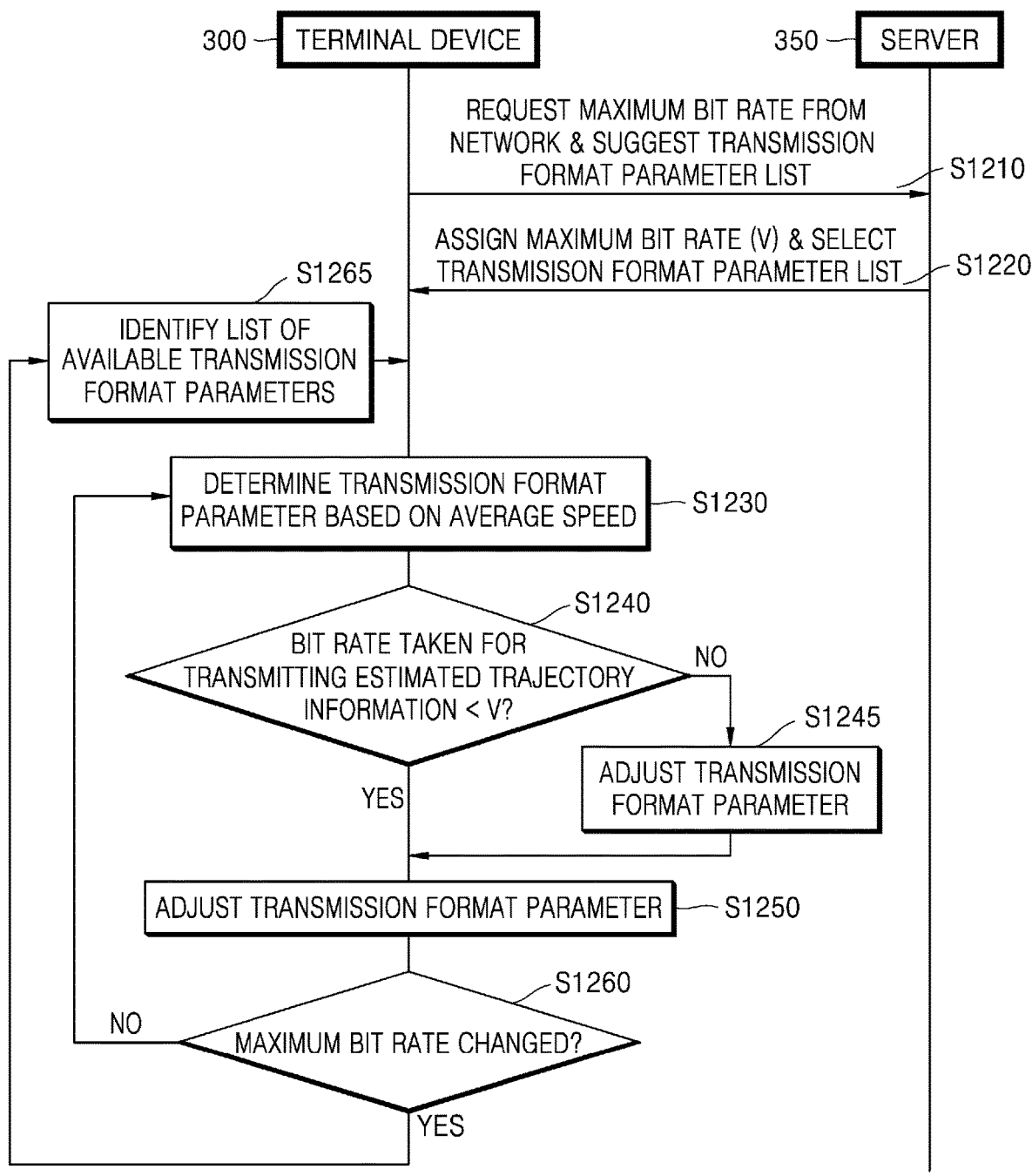
FIG. 12 is a detailed flowchart of a method of transmitting estimated trajectory information, performed by a terminal device, according to an embodiment.

FIG. 12 is a detailed flowchart of a method of transmitting the estimated trajectory information, performed by the terminal device 300, according to an embodiment.

In operation S1210, the terminal device 300 according to an embodiment may request information about a maximum bit rate from the server 350 and may suggest a transmission format parameter list including available transmission format parameters. The terminal device 300 may suggest, to the traffic management server 350 connected to a network, a maximum value of a bit rate that is to be used for a transmission of the estimated trajectory information, a supportable transmission scheme, etc. by using an IMS.

In operation S1220, the server 350 according to an embodiment may assign the maximum bit rate v in response to the request received from the terminal device 300 and may select at least one acceptable transmission format parameter from among transmission format parameters included in the suggested list. The traffic management server 350 may determine the maximum bit rate which may be assigned to the terminal device 300 and the acceptable transmission format by taking into account a rate system to which the terminal device 300 subscribes or a road condition, and may transmit the maximum bit rate and the acceptable transmission format to the terminal device 300.

FIG. 11 illustrates an example of an SDP offer including a suggestion of the terminal device 300 related to a method of transmitting estimated trajectory information. Also, FIG. 13 illustrates an example of an SDP answer including a response of a server with respect to the SDP offer.

In the SDP offer of FIG. 13, the terminal device 300 may suggest that longitude, latitude, and elevation information be transmitted to the traffic management server by using a bit rate of 3000 kbps (3 Mbps). Also, the terminal device 300 may estimate a trajectory for the seconds of x=10, 8, 6 in a second unit of y=0.01 and may suggest to the server 350 using one of three schemes of transmitting packets of z=10 per second.

In the SDP answer of FIG. 13, the server 350 may determine that the elevation information is not needed and may reduce the maximum bit rate to be used to 2 Mbps by excluding the elevation information in the SDP answer. Also, in the SDP answer of FIG. 13, the server 350 may exclude the scheme that uses the largest bit rate ([x=10, y=0.01, z=10] in the SDP offer of FIG. 13) from the three schemes suggested by the vehicle and may request the terminal device 300 to estimate the trajectory for the seconds of x=8 in the second unit of y=0.01 and transmit the packets of z=10 per second or to estimate the trajectory for the seconds of x=6 in the second unit of y=0.01 and transmit the packets of z=10 per second.

In operation S1230, the terminal device 300 according to an embodiment may determine the transmission format parameter, based on an average speed. The terminal device 300 may select one transmission format parameter suitable for the average speed, from among one or more transmission format parameters selected by the server. For example, the terminal device 300 may select (x0, y0, z0) as the transmission format parameter suitable for an average speed of the vehicle for recent a seconds.

In operation S1240, the terminal device 300 according to an embodiment may determine whether a bit rate taken to transmit the estimated trajectory information by using the transmission parameter determined in operation S1230 is less than the bit rate v. In operation S1245, when the bit rate that is taken is equal to or greater than the bit rate v, the terminal device 300 according to an embodiment may adjust the transmission format parameter.

The terminal device 300 may generate the estimated trajectory information by using the transmission format parameter determined in operation S1250 or the transmission parameter adjusted in operation S1245 and may transmit the generated estimated trajectory information to the server 350 (S1250).

For example, the terminal device 300 may select the transmission format parameter (x0, y0, z0) as a transmission scheme suitable for the average speed of the vehicle for the recent a seconds. A bit rate that is taken to transmit the estimated trajectory information by using the selected transmission format parameter (x0, y0, z0) may be calculated as 8Nx0z0/y0 (bps). The terminal device 300 may determine whether or not the bit rate that is taken according to the selected scheme is less than the maximum bit rate v permitted by the network.

When the bit rate 8Nx0z0/y0 (bps) that is taken according to the selected scheme is within the maximum bit rate v that is permitted by the network, the terminal device 300 may transmit the estimated trajectory information for b0 seconds by using the selected transmission format parameter (x0, y0, z0).

When the bit rate 8Nx0z0/y0 (bps) that is taken according to the selected scheme is equal to or greater than the maximum bit rate v that is permitted by the network, the terminal device 300 may adjust the transmission scheme to be within the permitted range by adjusting the transmission format parameter. The terminal device 300 may adjust the transmission format parameter to (x1, y1, z1). The terminal device 300 may adjust the transmission format parameter such that a bit rate 8Nx1z1/y1 (bps) that is taken according to the adjusted transmission format parameter is within the maximum bit rate v that is permitted by the network. The terminal device 300 may transmit the estimated trajectory information for b1 seconds by using the adjusted transmission format parameter (x1, y1, z1).

The terminal device 300 may transmit the estimated trajectory information by including the transmission format parameter used to configure the estimated trajectory information that is transmitted to the server 350 in a header. The server 350 may extract the transmission format parameter (x, y, z) used to configure the corresponding information, from the header attached to the estimated trajectory information received from the terminal device 300.

According to cases, the terminal device 300 may identify whether the network changes the maximum bit rate assigned to the estimated trajectory information (S1260). When the maximum bit rate is not changed, the terminal device 300 may repeatedly perform operations S1230 through S1250. When it is determined that the maximum bit rate assigned to the terminal device 300 is changed in operation S1260, the terminal device 300 may return to operation S1265 and may identify the changed maximum bit rate and a newly assigned transmission format parameter list.

As described above, in the autonomous driving system according to an embodiment of the disclosure, the terminal device 300 may be assigned a maximum bit rate available to a vehicle transmitting estimated trajectory information in various road conditions or a transmission scheme from a mobile communication network. Also, the terminal device 300 may transmit the estimated trajectory information to the server 350 by autonomously adjusting the transmission scheme of the estimated trajectory information or the bit rate according to a condition of the road on which the vehicle drives or a vehicle speed. Thus, the autonomous driving system according to an embodiment may maximize the usage efficiency of limited frequency resources and minimize the loss of the estimated trajectory information.

Figure 14A:
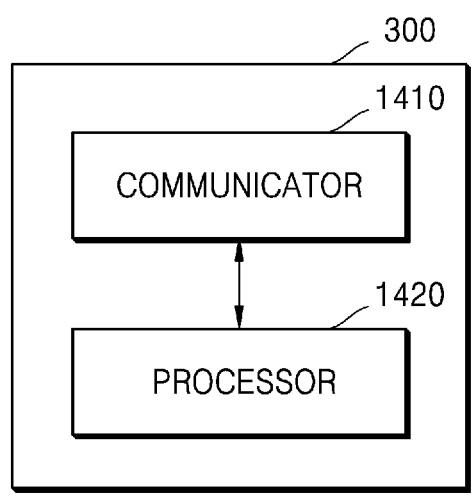
FIGS. 14A and 14B illustrate a structure of a terminal device according to an embodiment.
Figure 14B:
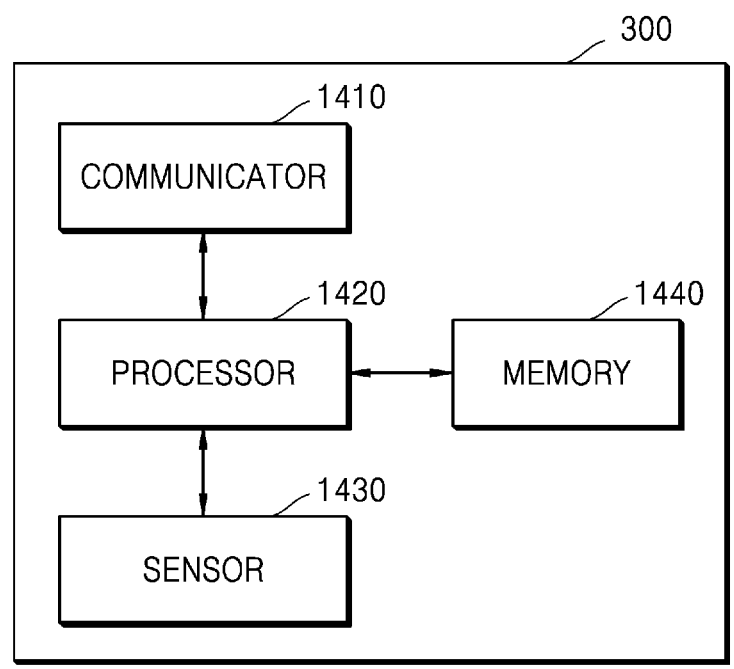

FIGS. 14A and 14B illustrate a structure of a terminal device according to an embodiment.

The terminal device 300 mounted in an autonomous vehicle and communicating with a server, according to an embodiment, may include a communicator 1410 and at least one processor 1420. However, the terminal device 300 may be realized by including more components than all of the components illustrated in FIG. 14A. For example, as illustrated in FIG. 14B, the terminal device 300 according to an embodiment may further include a sensor 1430 and a memory 1440.

FIGS. 14A and 14B illustrate that the terminal device 300 includes one processor. However, embodiments are not limited thereto, and the terminal device 300 may include a plurality of processors. At least one or more of operations and functions of the processor 1420 described below may be performed by the plurality of processors. The terminal device 300 illustrated in FIGS. 14A and 14B may perform the methods illustrated in FIGS. 6, 10, and 12, and the descriptions are not repeated.

The communicator 1410 according to an embodiment may receive network information from the server 350. The communicator 1410 may transmit estimated trajectory information generated by the processor 1420 based on the network information to the server 350.

The communicator 1410 may include a packet-based network interface for transmitting signals compressed by the processor 1420 in a packet unit. The communicator 1410 may transmit and receive the signals compressed in the packet unit through the interface. The communicator 1410 may be connected to a modem for accessing a communication network.

The processor 1420 according to an embodiment may generate and transmit the estimated trajectory information of the autonomous vehicle and may control general operations of the terminal device 300. For example, the processor 1420 may control the communicator 1410, the sensor 1430, and the memory 1440.

First, the processor 1420 according to an embodiment may determine, based on the received network information, a format to transmit information to the server 350.

The network information may include a maximum bit rate assigned to the terminal device 300. When the processor 1420 determines the format to transmit the information to the server 350, the processor 1420 may determine a transmission format parameter.

For example, in order to transmit a plurality of coordinate values included in an estimated trajectory of the autonomous vehicle as the estimated trajectory information, the terminal device 300 may determine the transmission format parameter including at least one of a length (x) of time for which the trajectory of the autonomous vehicle is estimated, a time interval (y) between the coordinate values, a transmission cycle (z), and the number of bytes (N) required to transmit one coordinate value.

For example, the processor 1420 may determine available transmission format parameters based on the maximum bit rate received from the server 350 and may select one transmission format parameter from the available transmission format parameters.

As another example, the communicator 1410 may transmit a list of transmission format parameters available to the terminal device 300 to the server 350. The terminal device 300 may receive, from the server 350, one or more transmission format parameters selected by the server 350 from among the transmission format parameters included in the list and the maximum bit rate. The processor 1420 may select one transmission format parameter from the one or more transmission format parameters received from the server 350.

Also, when determining the transmission format parameter, the processor 1420 may consider an average speed of the autonomous vehicle.

The processor 1420 may determine a first transmission format parameter, based on the average speed of the autonomous vehicle. When a bit rate taken to transmit the estimated trajectory information by using the first transmission format parameter is equal to or greater than the maximum bit rate received from the server 350, the processor 1420 may adjust the first transmission format parameter to a second transmission format parameter. The processor 1420 may adjust the first transmission format parameter to the second transmission format parameter such that a bit rate taken to transmit the estimated trajectory information by using the second transmission format parameter is less than the maximum bit rate.

Next, the processor 1420 according to an embodiment may estimate a trajectory of the autonomous vehicle.

The processor 1420 according to an embodiment may estimate the trajectory of the autonomous vehicle in which the terminal device is mounted, based on at least one of a current location of the autonomous vehicle, map data, a shape of a lane in which the autonomous vehicle drives, a driving speed, and a driving direction.

As illustrated in FIG. 14B, the terminal device 300 mounted in the autonomous vehicle may further include the sensor 1430. The sensor 1430 may sense data for controlling the driving of the autonomous vehicle and estimating the driving trajectory. For example, the sensor 1430 may include a lidar device, a radar device, a GPS, a camera, etc.

The processor 1420 may determine the current location of the autonomous vehicle, the map data, the shape of the lane in which the autonomous vehicle drives, the driving speed, the driving direction, etc. based on the data sensed by the sensor 1430 and estimate the trajectory of the autonomous vehicle.

Next, the processor 1420 according to an embodiment may generate and transmit the estimated trajectory information indicating the estimated trajectory of the autonomous vehicle according to the determined format.

The processor 1420 may generate the estimated trajectory information including a plurality of packets each including x/y coordinate values indicating an estimated trajectory of the autonomous vehicle for x seconds, based on the transmission parameter (x, y, z) determined based on the maximum bit rate assigned from the server 350. The communicator 1410 may transmit the estimated trajectory information to the server 350 such that z packets are transmitted per second.

Also, when the maximum bit rate assigned from the server 350 is changed, the processor 1420 according to an embodiment may re-determine the format to transmit the information to the server based on the changed maximum bit rate.

The memory 1440 of FIG. 14B may store commands executed by the processor 1420 to control the terminal device 300, information processed by the processor 1420, information received from the server 350, etc.

The embodiments of the disclosure may be implemented as an S/W program including instructions stored in computer-readable storage media.

A computer is an electronic device for calling the instructions stored in the storage media and performing operations according to an embodiment of the disclosure in response to the called instructions. The computer may include an image transmission device and an image reception device according to embodiments of the disclosure.

The computer-readable storage media may be provided as non-transitory storage media. Here, the term "non-transitory" denotes that the storage media do not include a signal and are tangible, and the term does not distinguish a semi-permanent storage and a temporal storage of data in the storage media.

Also, electronic devices or methods according to embodiments of the disclosure may be provided as an inclusion of a computer program product. The computer program product may be transacted between a seller and a purchaser as a product.

The computer program product may include an S/W program and a computer-readable storage medium in which the S/W program is stored. For example, the computer program product may include a product (for example, a downloadable application) in the form of an S/W program that is electronically distributed through a manufacturer of an electronic device or an electronic market (for example, the Google Play store, the App Store, etc.). For the electronic distribution, at least a portion of the S/W program may be stored in storage media or temporarily generated. In this case, the storage media may include a server of the manufacturer, a server of the electronic market, or a storage medium of a broadcasting server that temporarily stores the SW program.

In a system including a server and a terminal (for example, the image transmission device or the image reception device), the computer program product may include a storage medium of the server or a storage medium of the terminal. Alternatively, when there is a third device (for example, a smartphone) connected for communication with the server or the terminal, the computer program product may include a storage medium of the third device. Alternatively, the computer program product may directly include an S/W program transmitted from the server to the terminal or the third device or transmitted from the third device to the terminal.

In this case, one of the server, the terminal, and the third device may execute the computer program product and perform the methods according to the embodiments of the disclosure. Alternatively, two or more of the server, the terminal, and the third device may execute the computer program and perform the methods according to the embodiments of the disclosure in a distributed fashion.

For example, the server (for example, a cloud server or an AI server) may execute the computer program product stored in the server and may control the terminal connected for communication with the server to perform the methods according to the embodiments of the disclosure.

As another example, the third device may execute the computer program product and may control the terminal connected for communication with the third device to perform the methods according to the embodiments of the disclosure. As a detailed example, the third device may remotely control the image transmission device or the image reception device to transmit or receive a packet image.

When the third device executes the computer program product, the third device may download the computer program product from the server and may execute the downloaded computer program product. Alternatively, the third device may execute the computer program product that is preloaded and may perform the methods according to the embodiments of the disclosure.

The invention claimed is:

1. A method, performed by a terminal device mounted in an autonomous vehicle, of transmitting information to a server, the method comprising:
    identifying a format to transmit the information to the server, based on network information received from the server;
    estimating a trajectory of the autonomous vehicle;
    obtaining estimated trajectory information indicating the estimated trajectory of the autonomous vehicle according to the identified format; and
    transmitting the estimated trajectory information to the server,
    wherein the identifying of the format to transmit the information comprises:
        identifying available transmission format parameters, based on the network information; and
        identifying at least one of a transmission format parameter for transmitting information related to the estimated trajectory of the autonomous vehicle among the available transmission format parameters.

2. The method of claim 1,
    wherein the network information includes a maximum bit rate assigned to the terminal device, and
    wherein the identifying of the format to transmit the information comprises identifying, in order to transmit a plurality of coordinate values included in the estimated trajectory of the autonomous vehicle, a transmission format parameter of at least one of a length (x) of time for which the trajectory of the autonomous vehicle is estimated, a time interval (y) between the coordinate values, a transmission cycle (z), and a number (N) of bytes required for transmitting one coordinate value.

3. The method of claim 1,
    wherein the network information includes a maximum bit rate assigned to the terminal device, and
    wherein the method further comprises:
        in case that a list of transmission format parameters available to the terminal device is transmitted to the server;
        receiving, from the server, one or more transmission format parameters selected from among the transmission format parameters included in the list and the maximum bit rate; and
        selecting one transmission format parameter from the received one or more transmission format parameters.

4. The method of claim 1,
    wherein the network information includes a maximum bit rate assigned to the terminal device,
    wherein the identifying of the format to transmit the information further comprises:
        identifying a first transmission format parameter, based on an average speed of the autonomous vehicle; and
        in response to a bit rate of a case where the estimated trajectory information is transmitted by using the first transmission format parameter is being greater than or equal to the maximum bit rate, adjusting the first transmission format parameter to a second transmission format parameter, and
    wherein a bit rate of a case where the estimated trajectory information is transmitted by using the second transmission format parameter is less than the maximum bit rate.

5. The method of claim 1, wherein the estimating of the trajectory of the autonomous vehicle in which the terminal device is mounted comprises estimating the trajectory based on at least one of a current location of the autonomous vehicle, map data, a shape of a lane in which the autonomous vehicle drives, a driving speed, and a driving direction.

6. The method of claim 1,
    wherein the identifying of the format to transmit the information further comprises identifying a length (x) of time for which the trajectory of the autonomous vehicle is estimated, a time interval (y) between coordinate values, and a transmission cycle (z), based on a maximum bit rate assigned to the terminal device from the server,
    wherein the obtaining of the estimated trajectory information comprises obtaining the estimated trajectory information including a plurality of packets each including x/y coordinate values indicating the estimated trajectory of the autonomous vehicle for x seconds, and
    wherein the transmitting of the estimated trajectory information comprises transmitting the estimated trajectory information such that z packets are transmitted per one second.

7. The method of claim 1,
    wherein the network information includes a maximum bit rate assigned to the terminal device, and
    wherein the method further comprises, in response to the maximum bit rate assigned to the terminal device being changed, re-determining the format to transmit the information to the server based on the changed maximum bit rate.

8. A terminal device mounted in an autonomous vehicle and communicating with a server, the terminal device comprising:
    a communicator configured to receive network information from the server; and
    at least one processor configured to:
        identify a format to transmit information to the server based on the received network information, estimate a trajectory of the autonomous vehicle, and
        obtain estimated trajectory information indicating the estimated trajectory of the autonomous vehicle according to the identified format,
    wherein the communicator is further configured to transmit the estimated trajectory information to the server, and
    wherein the at least one processor is further configured to, when identifying the format to transmit the information:

identify available transmission format parameters based on the network information, and identify, at least one of a transmission format parameter for transmitting information related to the estimated trajectory of the autonomous vehicle among the available transmission format parameters.

9. The terminal device of claim 8, wherein the network information includes a maximum bit rate assigned to the terminal device, and wherein the at least one processor is further configured to, when identifying the format to transmit the information, identify, in order to transmit a plurality of coordinate values included in the estimated trajectory of the autonomous vehicle, a transmission format parameter of at least one of a length (x) of time for which the trajectory of the autonomous vehicle is estimated, a time interval (y) between the coordinate values, a transmission cycle (z), and a number (N) of bytes required for transmitting one coordinate value.

10. The terminal device of claim 8, wherein the network information includes a maximum bit rate assigned to the terminal device, and wherein the communicator is further configured to:

in case that a list of transmission format parameters available to the terminal device is transmitted to the server, receive, from the server, one or more transmission format parameters selected from among the transmission format parameters included in the list and the maximum bit rate, and in response to identifying the format to transmit the information, select one transmission format parameter from the received one or more transmission format parameters.

11. The terminal device of claim 8, wherein the network information includes a maximum bit rate assigned to the terminal device, and wherein the at least one processor is further configured to:

in response to identifying the format to transmit the information, identify a first transmission format parameter based on an average speed of the autonomous vehicle, and in response to a bit rate of a case where the estimated trajectory information is transmitted by using the first transmission format parameter is greater than or equal to the maximum bit rate, adjust the first transmission format parameter to a second transmission format parameter, and wherein a bit rate of a case where the estimated trajectory information is transmitted by using the second transmission format parameter is less than the maximum bit rate.

12. The terminal device of claim 8, wherein the at least one processor is further configured to estimate the trajectory of the autonomous vehicle in which the terminal device is mounted, based on at least one of a current location of the autonomous vehicle, map data, a shape of a lane in which the autonomous vehicle drives, a driving speed, and a driving direction.

13. The terminal device of claim 8, wherein the at least one processor is further configured to, when identifying of the format to transmit the information, identify a length (x) of time for which the trajectory of the autonomous vehicle is estimated, a time interval (y) between coordinate values, and a transmission cycle (z), based on a maximum bit rate assigned to the terminal device from the server, when obtaining the estimated trajectory information, obtain the estimated trajectory information including a plurality of packets each including x/y coordinate values indicating the estimated trajectory of the autonomous vehicle for x seconds, and when transmitting the estimated trajectory information, transmit the estimated trajectory information such that z packets are transmitted per one second.

14. The terminal device of claim 8, wherein the network information includes a maximum bit rate assigned to the terminal device, wherein the at least one processor is further configured to:

in response to the maximum bit rate assigned to the terminal device being changed, re-determine the format to transmit the information to the server based on the changed maximum bit rate.

15. An autonomous driving system, the system comprising:

a terminal device mounted in an autonomous vehicle, and a server, wherein the server is configured to transmit network information to the terminal device, wherein the terminal device is configured to:

identify a format to transmit information to the server based on the network information received from the server, estimate a trajectory of the autonomous vehicle, obtain estimated trajectory information indicating the estimated trajectory of the autonomous vehicle according to the identified format, and transmit the estimated trajectory information to the server, and wherein the identifying of the format to transmit the information comprises:

identifying available transmission format parameters, based on the network information, and identifying at least one of a transmission format parameter for transmitting information related to the estimated trajectory of the autonomous vehicle among the available transmission format parameters.

* * * * *